United States Patent
Appakutty (10) Patent No.: US 10,878,454 B2
(45) Date of Patent: Dec. 29, 2020

(54) METHOD AND SYSTEM FOR PREDICTING A TIME INSTANT FOR PROVIDING PROMOTIONS TO A USER

(71) Applicant: Wipro Limited, Bangalore (IN)

(72) Inventor: Rajagopal Appakutty, Chennai (IN)

(73) Assignee: Wipro Limited, Bangalore (IN)

( * ) Notice: Subject to any disclaimer, the term of this patent is extended or adjusted under 35 U.S.C. 154(b) by 346 days.

(21) Appl. No.: 15/427,189

(22) Filed: Feb. 8, 2017

(65) Prior Publication Data

US 2018/0181991 A1   Jun. 28, 2018

(30) Foreign Application Priority Data

Dec. 23, 2016   (IN) .............................. 201641044055

(51) Int. Cl.
*G06Q 30/02* (2012.01)

(52) U.S. Cl.
CPC ..... *G06Q 30/0261* (2013.01); *G06Q 30/0269* (2013.01)

(58) Field of Classification Search
CPC ........... G06Q 30/0224; G06Q 30/0235; G06Q 30/0261; G06Q 30/0269
USPC ..................... 705/14.25, 14.35, 14.61, 14.66
See application file for complete search history.

(56) References Cited

U.S. PATENT DOCUMENTS

| | | | |
|---|---|---|---|
| 9,053,508 B2 | 6/2015 | Adoni et al. | |
| 2008/0055109 A1* | 3/2008 | Freathy | G07C 9/00111 340/8.1 |
| 2008/0065468 A1 | 3/2008 | Berg et al. | |
| 2011/0085700 A1 | 4/2011 | Lee | |
| 2014/0351098 A1* | 11/2014 | Shafer | G06Q 10/087 705/28 |
| 2015/0206188 A1* | 7/2015 | Tanigawa | G06Q 30/0261 705/14.58 |
| 2016/0180404 A1 | 6/2016 | Stern et al. | |
| 2016/0189174 A1* | 6/2016 | Heath | G06Q 30/0201 705/7.29 |
| 2016/0196575 A1* | 7/2016 | Uchida | G06Q 30/0261 705/14.45 |
| 2017/0277365 A1* | 9/2017 | Gaidar | G06F 3/167 |

OTHER PUBLICATIONS

Schreuder, Elaine, et al., Emotional Responses to Multisensory Environmental Stimuli: A Conceptual Framework and Literature Review, SAGE Open, Jan.-Mar. 2016, downloaded Aug. 28, 2020 from file:///H:/Case%20Claim%20Notes/15427189%20Schreuder-EmotionalResponsesToMultisensoryStimuli%20-%202016.pdf (Year: 2016).*

* cited by examiner

*Primary Examiner* — Scott D Gartland
(74) *Attorney, Agent, or Firm* — Finnegan, Henderson, Farabow, Garrett & Dunner, LLP (57) ABSTRACT

A method and a system are described for providing one or more promotions to a user. The method includes detecting, by a monitoring device, a movement event associated with an object using one or more sensors. The method includes initializing, by the monitoring device, capturing of audio data of a user in contact with the object on detection of the movement event. The method further includes determining, by the monitoring device, an emotion, associated with the object, of the user based on the audio data. The method further includes predicting in real time, by the monitoring device, a time instant at which one or more promotions are provided to the user based on the determined emotion and the audio data.

15 Claims, 3 Drawing Sheets

METHOD AND SYSTEM FOR PREDICTING A TIME INSTANT FOR PROVIDING PROMOTIONS TO A USER

TECHNICAL FIELD

The present subject matter is related, in general to retail product monitoring systems, and more particularly, but not exclusively to a method and a system for predicting a time instant for providing promotions to a user.

BACKGROUND

Conventional retail product monitoring systems analyze consumer behavior to improve sales of products within a retail store. In an embodiment, Radio Frequency Identification (RFID) based security tags may be used in the retail shop to track object for sale and to prevent theft or shop lifting. State of the art RFID security tags utilize sensors such as, accelerometer to track consumer behavior and improve sales of products within the retail store. Further, the consumer's behavior and emotion associated with a product have a crucial impact on enabling the sale of the product.

However, existing retail product monitoring systems do not take in account the consumer's emotion for converting the consumer's interest into a sale. Additionally, there is no mechanism via which a designer of the product may receive feedback from the consumer. In an embodiment, such feedback may correspond to a reason of abandonment of the product, a reason for non-conversion of the consumer's interest into a sale, and the like. Additionally, existing retail product monitoring systems may utilize an imaging sensor to track the consumer's behavior. Thus, such monitoring systems are intrusive and do not safe guard privacy interest of the consumer. Further, such intrusive monitoring may prevent the consumer from displaying actual behavior and thus may be an obstacle for converting the consumer's interest into a sale.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method for predicting a time instant for providing one or more promotions to a user. The method may include a monitoring device for detecting a movement event associated with an object using one or more sensors. The method may further include initializing capturing of audio data of a user in contact with the object on detection of the movement event. The method may further include determining an emotion, associated with the object, of the user based on the audio data. The method may further include predicting in real time a time instant at which one or more promotions are provided to the user based on the determined emotion and the audio data.

According to embodiments illustrated herein, there may be provided a monitoring device, to predict a time instant to provide one or more promotions to a user. The monitoring device may comprise a processor and a memory communicatively coupled to the processor. The memory stores processor instructions, which, on execution, causes the processor to detect a movement event associated with an object using one or more sensors. The processor may be further configured to initialize capturing of audio data of a user in contact with the object on detection of the movement event. The processor may be further configured to determine an emotion, associated with the object, of the user based on the audio data. The processor may be further configured to predict in real time a time instant at which one or more promotions are provided to the user based on the determined emotion and the audio data.

According to embodiments illustrated herein, there may be provided a non-transitory computer-readable storage medium having stored thereon, a set of computer-executable instructions for causing a computer comprising one or more processors to perform steps of detecting a movement event associated with an object using one or more sensors. The one or more processors may be configured to initialize capturing of audio data of a user in contact with the object on detection of the movement event. The one or more processors may be further configured to determine an emotion, associated with the object, of the user based on the audio data. The one or more processors may be further configured to predict in real time a time instant at which one or more promotions are provided to the user based on the determined emotion and the audio data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
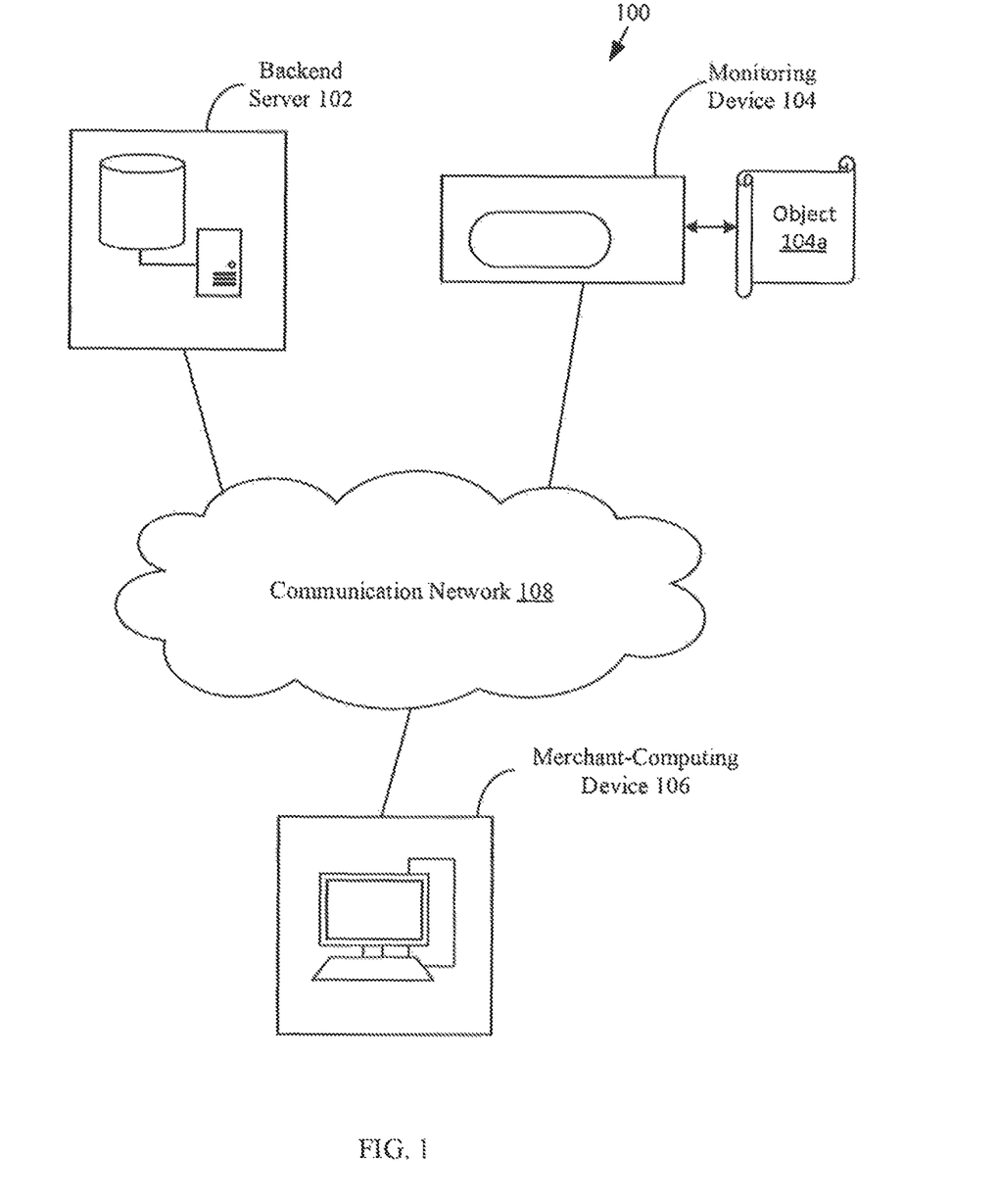
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 may include a backend server 102, a monitoring device 104, a merchant-computing device 106, and a communication network 108. The monitoring device 104 may be communicatively coupled to the backend server 102 and the merchant-computing device 106 via the communication network 108. In an embodiment, the monitoring device 104 may communicate with the backend server 102, via the communication network 106 using one or more protocols such as, but not limited to, Open Database Connectivity (ODBC) protocol and Java Database Connectivity (JDBC) protocol. In an embodiment, the merchant-computing device 106 may communicate with the monitoring device 104, via the communication network 106.

In an embodiment, the backend server 102 may refer to a computing device that may be configured to store one or more promotions. In an embodiment, the backend server 102 may be configured to but not limited to create, edit, store, insert and update one or more promotions. In an embodiment, the backend server 102 may be configured to receive location data of a user associated with an object 104a from the monitoring device 104. Based on the received location data, the backend server 102 may be configured to store the location data associated with the user. In an embodiment, the backend server 102 may be configured to receive emotion of the user associated with the object 104a from the monitoring device 104. Based on the received emotion, the backend server 102 may be configured to store the emotion. In an embodiment, the backend server 102 may be configured to create an association between the emotion of the user and the location data.

In an embodiment, the backend server 102 may be configured to receive request from monitoring device for transmitting one or more promotions selected by the monitoring device 104. Further, in response to the received request, the backend server 102 may be configured to transmit the selected one or more promotions to the monitoring device 104. The backend server 102 may be configured to receive data related to purchase of the object 104a from the merchant-computing device 106 and/or the monitoring device 104. In an embodiment, backend server 102 may be configured to store at least one of the association of the user with the location, audio data pertaining to the object 104a, emotions detected and time duration of the user with the object 104a, and the one or more promotions provided to the user. The backend server 102 may be further configured to transmit data pertaining to the association to a third-party server (not shown), a designer of the object 104a, or a computing system (not shown).

In an embodiment, the backend server 102 may include hardware and/or software that may be configured to perform one or more predetermined operations. In an embodiment, the backend server 102 may be realized through various technologies such as, but not limited to, Microsoft® SQL Server, Oracle®, IBM DB2®, Microsoft Access®, PostgreSQL®, MySQL® and SQLite®, and the like.

A person with ordinary skills in the art will understand that the scope of the disclosure is not limited to the backend server 102 as a separate entity. In an embodiment, the functionalities of the backend server 102 may be integrated into the monitoring device 104, and vice versa.

In an embodiment, the monitoring device 104 may refer to a computing device or a software framework hosting an application or a software service. In an embodiment, the monitoring device 104 may be implemented to execute procedures such as, but not limited to, programs, routines, or scripts stored in one or more memories for supporting the hosted application or the software service. In an embodiment, the hosted application or the software service may be configured to perform one or more predetermined operations. In an embodiment, the monitoring device 104 may be configured to detect a movement event associated with an object 104a using one or more sensors. In an embodiment, the monitoring device 104 may be configured to initialize capturing of audio data of a user in contact with the object 104a on detection of the movement event. In an embodiment, the monitoring device 104 may determine an emotion of the user associated with the object 104a based on the captured audio data. In an embodiment, the monitoring device 104 may predict in real time a time instant at which one or more promotions may be provided to the user based on the determined emotion and the audio data. In an embodiment, the monitoring device 104 may be configured to determine a time duration for which the object 104a is with the user based on the movement event. In an embodiment, the monitoring device 104 may be configured to select the one or more promotions to be provided to the user based on at least one of the determined emotion, one or more pre-defined locations, a pre-defined sale target, and historical behavior, associated with the object 104a, of a plurality of users. The operation of the monitoring device 104 has been discussed later in conjunction with FIG. 2.

A person having ordinary skill in the art will appreciate that the scope of the disclosure is not limited to realizing the backend server 102 and the merchant-computing device 106 as separate entities. In an embodiment, the backend server 102 may be realized as an application program installed on and/or running on the merchant-computing device 106 without departing from the scope of the disclosure.

In an embodiment, the merchant-computing device 106 may refer to a computing device used by a merchant or a retail shop owner or any person authorized to approve or edit or modify or define one or more promotions related to the object 104a, herein after referred to as 'owner'. The merchant-computing device 106 may comprise of one or more processors and one or more memories. The one or more memories may include computer readable code that may be executable by the one or more processors to perform predetermined operations. In an embodiment, the merchant-computing device 106 may present a user-interface to the owner to provide an input for selection, modification or creation of one or more promotions associated with the object 104*a*. In an embodiment, the owner's input may apply to one or more other objects based on similarities to object 104*a* for which the owner has provided the input. In an embodiment, the merchant-computing device 106 may be configured to accept input from the owner for defining the one or more promotions. In an embodiment, the merchant-computing device 106 may be configured to provide owner output that comprises the statistics of user emotions and audio data associated with the object 104*a*. In an embodiment, the merchant-computing device 106 may be further configured to receive a user's buying request. Examples of the merchant-computing device 106 may include, but are not limited to, a personal computer, a laptop, a personal digital assistant (PDA), a mobile device, a tablet, or any other computing device.

In an embodiment, the communication network 108 may correspond to a communication medium through which the backend server 102, the monitoring device 104, and the merchant-computing device 106 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
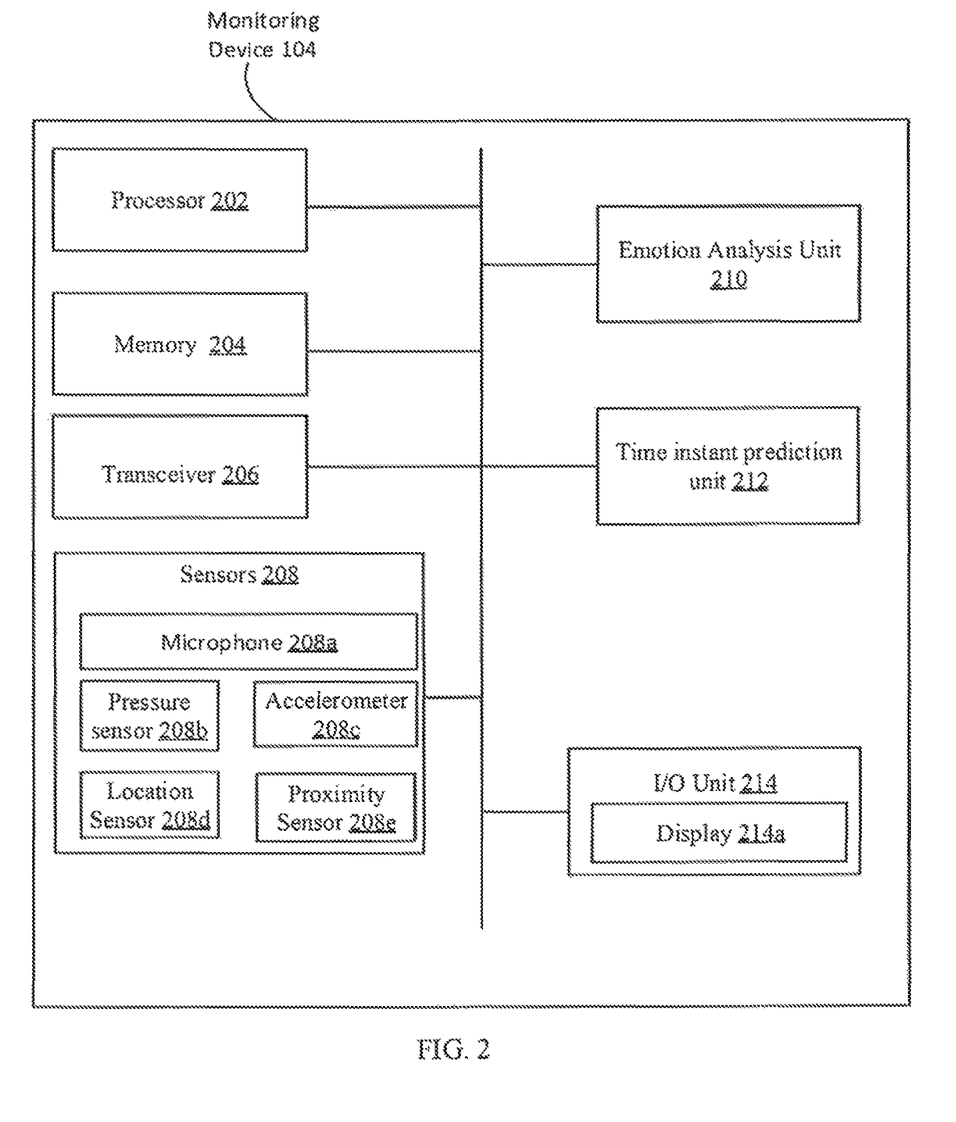
FIG. 2 is a block diagram that illustrates a monitoring device for predicting a time instant for providing one or more promotions to a user.

FIG. 2 is a block diagram that illustrates a monitoring device 104 for predicting a time instant for providing one or more promotions to a user, in accordance with some embodiments of the present disclosure. The monitoring device 104 may further include a processor 202, a memory 204, a transceiver 206, sensors 208, an emotion analysis unit 210, a time instant prediction unit 212, and an input/output unit 214. The processor 202 may be communicatively coupled to the memory 204, the transceiver 206, sensors 208, the emotion analysis unit 210, the time instant prediction unit 212 and the input/output unit 214. In an embodiment, the sensors 208 may comprise, but not limited to, a microphone 208*a*, a pressure sensor 208*b*, an accelerometer 208*c*, a location sensor 208*d* and proximity sensor 208*e*.

The processor 202 may include suitable logic, circuitry, interfaces, and/or code that may be configured to execute a set of instructions stored in the memory 204. The processor 202 may be implemented based on a number of processor technologies known in the art. Examples of the processor 202 may include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may include suitable logic, circuitry, interfaces, and/or code that may be configured to store the set of instructions, which may be executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 may include suitable logic, circuitry, interfaces, and/or code that may be configured to transmit information pertaining to the emotion analysis unit 210 to the backend server 102 and/or the merchant-computing device 106. In an embodiment, the transceiver 206 may be configured to receive one or more promotions from the backend server 102. In an embodiment, the transceiver 206 may be configured to receive a selection of one or more promotions from the merchant-computing device 108. The transceiver 206 may implement one or more known technologies to support wired or wireless communication with the communication network. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The sensor 208 may detect and/or measure events or changes in quantities and may provide a corresponding output, generally as an electrical or optical signal. Sensors 208 may be analog or digital. In an embodiment sensor 208 may comprise, but not limited to, a microphone 208*a*, pressure sensor 208*b*, accelerometer 208*c*, location sensor 208*d*, and proximity sensor 208*e*. The microphone 208*a* may capture the audio data provided by the user. The microphone 208*a* may be a near field microphone and/or a far field microphone. In an embodiment, the pressure sensor 208*b* may detect an amount of pressure exerted on the object 104*a*. For example, the pressure sensor 208*b* may detect an amount of pressure exerted by one or more object 104 as onto the object 104*a* and detect whether the object is located within a stack. The accelerometer 208*c* may be configured to detect the movement event of the monitoring device 104. In an embodiment, the accelerometer 208*c* may be a tri-axial accelerometer. The location sensor 208*d* may use, but not limited to, Global Positioning System (GPS), Global Navigation Satellite System (GLONASS) or network location to determine location data of a user. The proximity sensor 208*e* may be configured to detect whether the monitoring device 104 attached to the object 104*a* is in proximity to the user. In an embodiment, the proximity sensor 208*e* may be capacitive or photoelectric for the purposes of this invention.

The emotion analysis unit 210 may include suitable logic, circuitry, interfaces, and/or code that may be configured to determine an emotion, associated with the object 104*a*, of the user based on the audio data. In an embodiment, the emotion analysis unit 210 may be configured to determine seven core emotions and a neutral state. In an embodiment, the emotion analysis unit 210 may be configured to receive audio data from the microphone 208a. In an embodiment, the emotion analysis unit 210 may be configured to receive location data of the user from the location sensor 208d. In an embodiment, the emotion analysis unit 210 may be configured to receive the reading of the proximity sensor 208e. In an embodiment, the emotion analysis unit 210 may be configured to determine the time duration of the occurrence of the movement event based on the accelerometer data obtained from the accelerometer 208c. In an embodiment, the audio data may be captured by the microphone 208a for the determined time duration.

The time instant prediction unit 212 may include suitable logic, circuitry, interfaces, and/or code that may be configured to determine a time instant at which one or more promotions may be provided to the user based on the determined emotion and the audio data. In an embodiment, the time instant prediction unit 212 may be configured to receive an input from the emotion analysis unit 210. In an embodiment, the time instant prediction unit 212 may be configured to send a request to the backend server 102. In an embodiment, the request may be to retrieve one or more selected promotions. In an embodiment, the request may be related to data pertaining to user behavior with the object 104a. In an embodiment, the time instant prediction unit 212 may be configured to receive an input from merchant-computing device 106. In an embodiment, the input may be the selected one or more promotions. The Input/Output (I/O) unit 214 may include suitable logic, circuitry, interfaces, and/or code that may be configured to receive an input or transmit an output. The input/output unit 214 may include various input and output devices that may be configured to communicate with the processor 202. Examples of the input devices may include, but are not limited to, a keyboard, a mouse, a joystick, a touch screen, a microphone, and/or a docking station. Examples of the output devices may include, but are not limited to, a display 214a and/or a speaker (not shown). In an embodiment, the I/O unit 214 may include a display 214a for the displaying one or more promotions. In an embodiment, the I/O unit 214 may include and speaker (not shown) for providing one or more promotions.

In operation, the monitoring device 104 may detect a movement event associated with an object 104a using one or more sensors 208. The monitoring device 104 may be attached to the object 104a. In an embodiment, the object 104a may refer to an apparel that is for sale at a retail store. It is to be noted here that the terms 'object' and 'apparel' have been interchangeably used in the rest of the specification. In an embodiment, the one or more sensors 208 may include at least one of a microphone 208a, a pressure sensor 208b, an accelerometer 208c, a location sensor 208d or a proximity sensor 208e.

In an embodiment, the one or more sensors 208 may be configured to detect the movement event based on at least one of or a combination of pressure sensor data obtained from the pressure sensor 208b, accelerometer 208c data obtained from the accelerometer 208c, location data obtained from the location sensor 208d, and proximity data obtained from the proximity sensor 208e. In an embodiment, the movement event may be detected when the accelerometer 208c, associated with the object 104a, provides a reading that is greater than a pre-defined threshold. For example, when a user picks up the object 104a from a shelf or a hanger then the pick-up gesture may be recognized based on the accelerometer data obtained from the accelerometer 208c. The detected pick-up gesture event may be detected as a movement event. In an embodiment, a number of pick-up gestures for an object 104a may be counted by the monitoring device 104 based on the accelerometer reading obtained from the accelerometer 208c. In an embodiment, the number of pick-up gestures may be transmitted by the transceiver 206 to the backend server 102 via the communication network 108. In an embodiment, the movement event may be detected based on determining a change in a location of the object 104a based on the location data obtained from the location sensor 208d. For example, the user may pick up the apparel (object 104a) from a stack at a first location and may walk towards a trial room at a second location. Such a change in location of the apparel (object 104a) from the first location to the second location may be detected as a movement event.

In an embodiment, the emotion analysis unit 210 may be configured to determine a time duration for which the user may have handled the object 104a based on the accelerometer data obtained from the accelerometer 208c, the location sensor data obtained from the location sensor 208d, and the proximity sensor data obtained from the proximity sensor 208e. For example, consider a scenario that the user has picked up an object 104a and has taken it to the trial room. In such a scenario, the first time instant at which the object 104a was picked by the user is the time instant at which the movement event is detected. Further, when the user drops the object 104a after using the object 104a in the trial room, then the second time instant at which the user drops the object 104a may be recorded as the end of the movement event. Thus, the time duration from the first time instant to the second time instant is the time duration during which the user was handling the object 104a. In an embodiment, if the accelerometer 208c data shows a value above a certain threshold for a pre-defined time duration then it may indicate that the user is handling the object 104a and considering to purchase the object 104a.

In an embodiment, the proximity sensor 208e may detect whether the object 104a is close to the user's body based on the proximity sensor data obtained from the proximity sensor 208e. In an embodiment, the proximity sensor 208e may detect whether the object 104a such as an apparel is worn by the user based on the proximity sensor 208e reading. For example, if the accelerometer 208c data shows a value above a certain threshold for a pre-defined time period and the proximity data obtained from the proximity sensor 208e indicates that the user is handling the apparel or has worn the apparel (object 104a).

A person having ordinary skill in the art will understand that the scope of the disclosure should not be limited to the determining the time duration of the object 104a with the user based on the aforementioned factors and using the aforementioned techniques. Further, the examples provided in supra are for illustrative purposes and should not be construed to limit the scope of the disclosure.

A person having ordinary skill in the art will understand that the scope of the disclosure should not be limited to the detecting the movement event based on the aforementioned factors and using the aforementioned techniques. Further, the examples provided in supra are for illustrative purposes and should not be construed to limit the scope of the disclosure.

After the detection of the movement event based on the above mentioned techniques, the microphone 208a may be configured to initialize capturing of the audio data of the user in contact with the object 104a. In an embodiment, if the accelerometer 208c data obtained from the accelerometer 208c is above a pre-defined threshold value at a first time instant, then such a detected movement event may trigger the microphone 208a to be turned ON at the first time instant. For example, when the user picks up the object 104a such as an apparel from a hanger, the accelerometer 208c data captured is '0' that indicates 'idle' at time T1. The pre-defined threshold value may be 5 indicative of a hand pickup gesture. A machine learning algorithm may recognize such gesture events by continuously reading value from the accelerometer. The machine learning algorithm may classify gestures as idle gesture or hand pickup gesture or user walking with object. Thus, based on the captured accelerometer 208c data, a movement event is detected at time T1. In response to such detection of the movement event at time T1, the microphone 208a may be initiated/turned ON to capture audio data of the user handling the object 104a at time T1. In an embodiment, if the location sensor 208d detects a location at a first time instant which is different from a location detected at a second time instant within a pre-defined threshold time interval, then such a change of location may trigger the microphone 208a to be turned ON at the second time instant. For example, if the predefined threshold time interval is set as 30 seconds then a change in location of the user within 30 seconds may initialize the microphone 208a.

In an embodiment, the capturing of audio data may be based on the proximity data obtained from the proximity sensor 208e. For example, initially the object 104a may be stacked and in proximity to other nearby body. The user may pick up the object 104a and this may create a fluctuation in the proximity data which may initialize the microphone 208a to capture the audio data. In an embodiment, a time threshold may be set for such fluctuations. The user may wear the object 104a for trail and the fluctuation in the proximity data above the set time threshold may initialize the microphone 208a to capture the audio data. In an embodiment, the capturing of audio data may be based on the pressure sensor data obtained from the pressure sensor 208e when the pressure sensor data is above a pre-defined threshold. For example, the user may press on the monitoring device 104 and the microphone 208a may be initialized for the capturing of the audio data.

In an embodiment, the microphone 209a may be configured to be switched OFF when the user has left the object 104a. In an embodiment, when the user drops the object 104a such as an apparel from the user's hand, the accelerometer data at time T2 is '−2'. Thus, the accelerometer data captured indicates that the apparel was dropped by the user. Such an event may be detected as a movement event that occurred at time T2. In response to such detection of the movement event at time T2, the microphone 208a may be turned OFF to capture audio data of the user handling the object 104a at time T2. In an embodiment, the microphone 208a may be turned OFF after a pre-defined time interval from time T2. For example, the user may drop the apparel 104a and leave after which the microphone 208a will automatically turn OFF after 20 seconds. In an embodiment, the microphone 208a may switch OFF after a pre-determined period of time, for which the apparel 104a is detected to remain idle. For example, the user instead of dropping the object 104a leaves it at the shelf then the microphone turns OFF after 40 seconds. In an embodiment, the microphone 208a may be configured to be switched OFF when the proximity sensor detects no fluctuation in the proximity sensor data for a predetermined period of time. In an embodiment, the microphone 208a may be configured to be switched OFF on detection of the change in decibels of sound level from high to low. For example, when the user walks away from the object audio data from the user becomes feeble over time. In an embodiment, the change in decibel of the audio data may be achieved by comparing the decibels on different microphones such as near field microphone and far field microphone.

In an embodiment, the microphone 208a may be configured to be in OFF position when the object 104a is located inside the shelf in between a stack. For example, the pressure sensor data and the location sensor data and the proximity sensor data may be fused to estimate the presence of the object in a shelf in between a stack. In an embodiment, the microphone 208a may be configured to be in OFF position on detection of an employee of the store handling the apparel 104a. In an embodiment, the detection of an employee may be made by means of Bluetooth signal from the employee's phone. In an embodiment, the microphone 208a may be configured to be in OFF position when the audio data being captured is not about object 104a. In an embodiment, the microphone 208a may be configured to be turned OFF when the user is attending a phone call. For example, the microphone 208a may recognize a phone ring tone and stop capturing the audio data for a pre-defined time interval.

The one or more processors may be further configured to recognize the spoken conversations (audio data) about the object 104a and apply natural language processing to understand user's level of interest and user's level of keenness to purchase the product and to understand more specific insights about what the user likes about the object, and to understand more specific insights about what factors are holding the user back from making the purchase. In an embodiment, the method may further include determining user's feedback about the object by near field speech recognition and natural language processing.

After the audio data is captured by the microphone 208a, the emotion analysis unit 210 may be configured to receive the audio data from the microphone 208a and determine an emotion, associated with the object 104a, of the user based on the captured audio data. In an embodiment, the emotion analysis unit 210 may be configured to perform tone analysis of the captured audio data. For example, the user may be saying in a low muttering tone "I like the cloth". The tone may indicate that the user may not be totally satisfied with the object 104a. In an embodiment, the captured audio data may be converted into text using one or more natural language processing techniques. In an embodiment, the tone analysis may be performed on the text obtained after conversion of the audio data into text. For example, the user may say "Oh! I like the cloth" in a low muttering tone. The emotion analysis unit 210 may be configured to detect a happy emotion associated with the object 104a by performing the tone analysis of the sentence.

In an embodiment, the emotion analysis unit 210 may determine an emotion, associated with the object 104a, of the user based on the audio data. For example, the audio data of the user captured at time T1 is "I like the cloth!". The emotion analysis unit 210 may be configured to determine that the emotion of the user is happy at time T1. In an embodiment, the emotion analysis unit 210 may be configured to determine positive or negative words in the audio data captured by the microphone 208a. For example, if a user says "wow" or phrases like "I like the print" then the emotion analysis unit 210 may be configured to detect the positive words about the object 104a and detect the emotion as happy. In an embodiment, the emotion analysis unit 210 may detect the emotion of the user with the object 104a based on a combination of tone analysis of the captured audio data and the words spoken by the user. For example, the user may express "How nice this material is!" in which the user tone is determined to be positive. The words used by the user may be determined to be positive based on the tone and the combined user emotion determined to be happy. In an example, the user may express in a questioning tone "How nice is the material?" The user's tone may be determined to be say, skeptical. The audio data contains the word "how" for with the determined emotion may be sad. In an embodiment, after combining the tone analysis and the words spoken by the user, the combined emotion determined is sad.

In an embodiment, the emotion analysis unit 210 may be further configured to associate the location data obtained from the location sensor 208*d* with the audio data captured by the microphone 208*a*. For example, the audio data A1 may be captured at location L1. For example, audio data captured at a shelf where the object 104*a* is displayed may be "WOW this shirt is nice". Thus, the location of the shelf and the captured audio data may be associated with each other. In another example, the location may be a trial room and the audio data captured at the trail room is "The shirt is nice and fits me well. I would like to buy some jeans that matches this shirt". Table 1 shown below is an illustrative example of the association created between captured audio, location data and determined emotion for the apparel 104*a* with an identification as for example, style no 5 (Style #5)

TABLE 1

| Object | Captured Audio | Location | Determined emotion |
|---|---|---|---|
| Style #5 | Wow, this shirt is nice | Shelf B1 area | Excited |
| Style #5 | Does not fit | Trial room no 4 area | Disappointed |

After determining the emotion of the user, the time instant prediction unit 212 may predict in real time a time instant at which one or more promotions may be provided to the user based on the determined emotion and the audio data. For example, a promotion of 10 percent on the apparel 104*a* may be flashed in the display 214*a* of the monitoring device 104 when the user exclaims "should I buy this?" and the detected emotion of the user is happy. In an embodiment, the time instant prediction unit 212 may predict the time instant for providing the one or more promotions based on the determined emotion of the user at a location. For example, a promotion may be flashed to the user at the time instant the user is at a location near the trial room and the emotion detected is happy.

In an embodiment, the time instant to provide one or more promotions to the user may be promotions may be provided to the user when the time duration of the user with the object 104*a* reaches a predefined threshold. In an embodiment, one or more promotions may be provided to the user when the time duration of the user with the object 104*a* reaches the predefined threshold and when the determined emotion of the user with the object 104*a* is happy. For example, a user A may handle a shirt for 10 minutes at the shelf where the shirt is displayed and the audio data captured is "Should I buy this?" Thus, the determined emotion is skeptical. at time T1. In such a scenario, a promotion of 20% discount may be provided to the user at time T1 or after 30 seconds from the time T1.

In an embodiment, the time instant to provide one or more promotions to the user may be promotions may be provided to the user based on the determined emotion of the user. For example, if the user's emotion is determined to be excited then one or more promotions may be provided to the user to convert the user interest into sale of the object 104*a*. The time instant prediction unit 212 may predict the time instant T1 at which the emotion of the user is excited.

In an embodiment, the selection of the promotions to be provided to the user may be based on at least one of a time duration of the user with the object 104*a*, a count of pick up gestures for an object 104*a*, location data of the object 104*a*, captured audio data of the user, and an emotion of the user. For example, in an embodiment the history related to the object may be taken into account while selecting the one or more promotions. In another example the user may be provided with a discount of 50 percent instead of 5 percent if the count of the pickup gesture for the object is more than a set threshold. In one embodiment one or more promotions may be selected based on the history of number of successful sale of at least one of the tag identification of the object 104*a*. For example, the object with style number #234 may have been successfully sold 100 times. In such case a promotion may be be selected having the least value of discount. In another example a promotion of higher value of discount may be selected if the time of the user with the object is more than 10 minutes at the trial room and the detected emotion is sad. In an example the user's emotion detected may be happy and the time instant prediction unit 212 may predict the time instant when the user is happy and select a 'buy one get one free' promotion.

In an embodiment, the time instant prediction unit 212 may select the one or more promotions to be provided to the user based on at least one of the determined emotion, one or more pre-defined locations, a pre-defined sale target, and historical behavior, associated with the object 104*a*, of a plurality of users. In an example the user may beat a location detected to be a trial room where there may be fluctuations in the readings of the proximity sensor 108*e*, indicating that the user may have worn the apparel 104*a*. The user emotions at that time may be determined to be skeptical, based on the user voice input like "the design is good but it is too large for me". At this instance the user may be provided with a promotion on tailoring discount. Table 2 shown below is an illustrative example of the association created between captured audio, location data and determined emotion, prediction of time instant for providing one or more promotions and the selected promotion(s).

TABLE 2

| | Object | Captured audio | Location data | Emotion | Time instant prediction | Promotion selection |
|---|---|---|---|---|---|---|
| Example 1 | Style# 55 | This top seems nice! | Shelf Area | Happy | Not Right Time | No Promotion selected |
| | Style# 55 | This does not fit well | Trail room Area | Sad | Right time | Free tailoring |
| Example 2 | Style# 390 | Look at this skirt! | Shelf area | Excited | Right time | 5 percent off |
| | Style# 390 | Should I buy it? | Shelf area | Sad | Right time | 20 percent off for the next ten minutes! |

In an embodiment, the time instant prediction unit 212 may select the one or more promotions from a list of promotions stored in the memory 204 based on the emotion determined. The list of promotions may include a promotion ID and a short description of the promotion. Table 3 shown below is an illustrative example of the list of promotions stored in the memory 204.

TABLE 3

| Promotion ID | Short Description |
| --- | --- |
| 111 | 5% discount on MRP. |
| 112 | 15% discount on MRP. |
| 113 | Buy one get 50% off on next |
| 114 | Buy two get 1 free |
| 115 | Free tailoring |

After the selection of the promotion from the list of promotions, a request may be transmitted, by the transceiver 206, to the backend server 102 for receiving the selected one or more promotions. The backend server 102 may transmit the selected one or more promotions to the monitoring device 104. In an embodiment, a request for the owner's approval for the selected one or more promotions may be made to the merchant computing device 106.

In an embodiment, the Input/Output (I/O) unit 210 may be configured to provide the received one or more promotions at the predicted time instant. In an embodiment, the display 214a may be utilized to display the received one or more promotions at the predicted time instant. For example, the display may flash the discount such as "Sale!!, buy within 15 minutes to avail 50% discount". In an embodiment, the Input/Output (I/O) unit 210 may be configured to provide the received one or more promotions to the user in the form of an audio output. For example, a beep sound may draw the user's attention and announce the discount to the user "Press the buy button within 20 seconds to avail 50% discount."

In an embodiment, the Input/Output (I/O) unit 210 may be configured to receive an input of user's choice of the one or more promotions. For example, the user may select a promotion by tapping on the screen when it is flashed and confirm buying. In an embodiment, the Input/Output (I/O) unit 210 may be configured to receive an input from the user, confirming the buying of the object 104a. For example, the user may press a button provided to avail the promotion on the object 104a.

Figure 3:
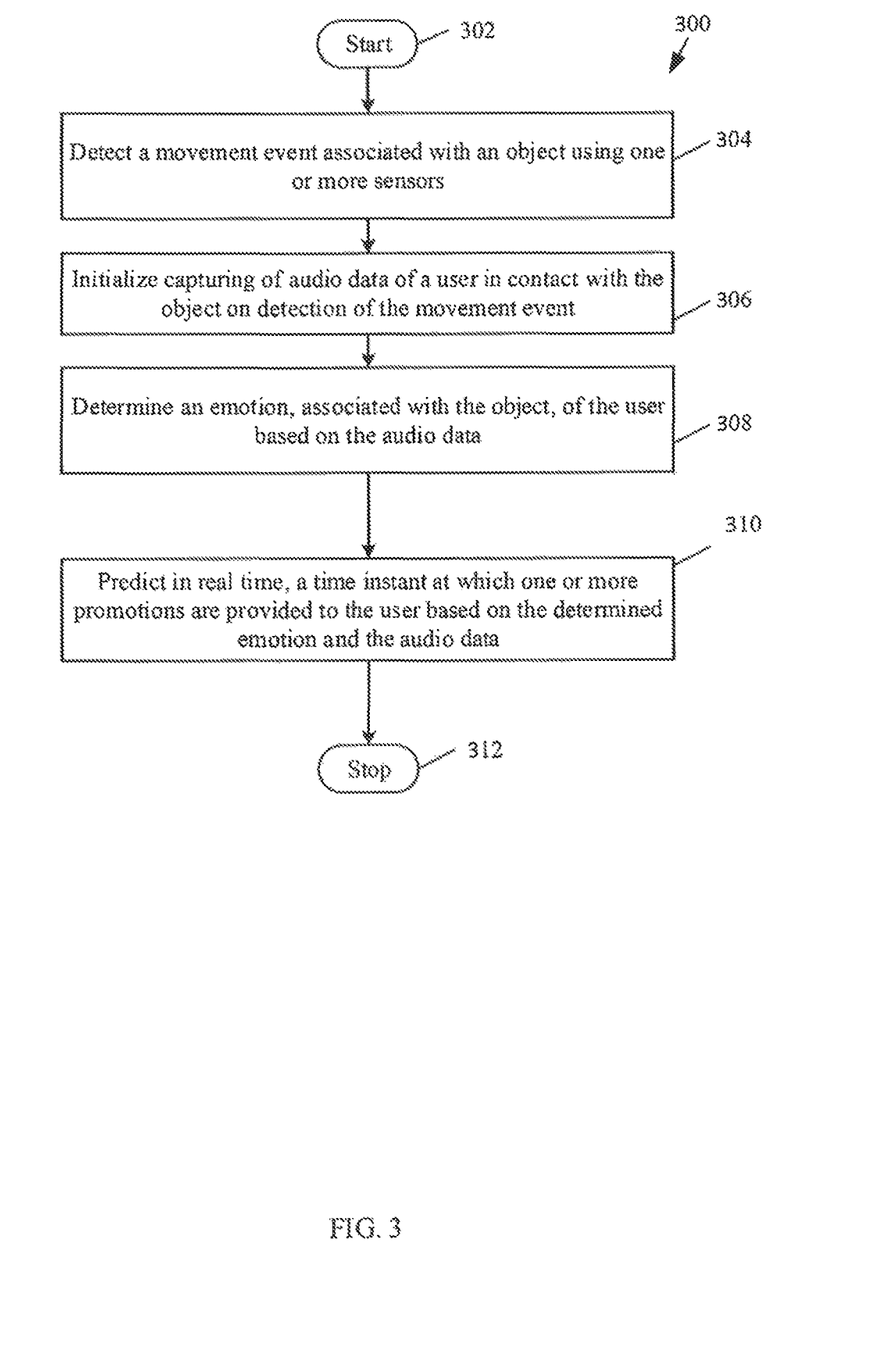
FIG. 3 is a flowchart illustrating a method for predicting a time instant for providing one or more promotions to a user.

FIG. 3 is a flowchart illustrating a method for predicting a time instant for providing one or more promotions to a user, in accordance with some embodiments of the present disclosure. The method starts at step 302 and proceeds to step 304. At step 304, the monitoring device 104 may detect a movement event associated with the object 104a using one or more sensors. At step 306, the monitoring device 104 may initialize capturing of the audio data of the user in contact with the object 104a on detection of the movement event. At step 308, the monitoring device 104 may determine an emotion, associated with the object 104a, of the user based on the audio data. At step 310, the monitoring device 104 may predict in real time, a time instant at which one or more promotions may be provided to the user based on the determined emotion and the audio data.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Some of the advantages of the disclosed method and system include non-intrusively detecting a user's emotions and providing one or more promotions to the user based on user's needs and preferences. The system is capable to selectively listen to user's conversation which is relevant to the context of the object 104a under consideration and detect emotions pertaining to the object 104a only. Further the system is capable of proactively discard the listening of the conversations not pertaining to the object 104a. The system may detect and identify the user's needs and emotions. The system is able to predict the time instant when one or more promotions may be effectively provided. In an embodiment, the one or more promotions provided to the user are based on the emotion of the user for an object 104a at a location. The system is capable of intelligently selecting one or more promotions based on the user's behavior with the object 104a. Another advantage of this invention is that the system is capable of providing feedback of the analytical data of the user or a plurality of users, non-intrusively, to a third party, which or who may be a designer of the object 104a.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

I claim:

1. A method for predicting a time instant or providing one or more promotions to a user, the method comprising:
    detecting, by a monitoring device, a movement event associated with an object using one or more sensors;
    initializing, by the monitoring device, capturing of audio data of a user in contact with the object on detection of the movement event;
    determining, by the monitoring device, an emotion, associated with the object, of the user based on the audio data;
    selecting, by the monitoring device, one or more promotions to be provided to the user based on the emotion, the audio data, one or more pre-defined locations, a pre-defined sale target, historical behavior of a plurality of users associated with the object, a time duration of the user with the object, and a count of pick-up gestures for the object;
    predicting in real time, by the monitoring device, a time instant at which the one or more promotions are provided to the user based on an association between at least one of the emotion determined based on the audio data, the audio data, location data of the object, location data of the user associated with the object, the time duration of the user with the object, and the pick-up gestures for the object, and
    transmitting, by the monitoring device, the association between the at least one of the emotion, the audio data, the location data of the object, the location data of the user associated with the object, the time duration of the user with the object, and the pick-up gestures for the object, to a third party server.

2. The method of claim 1, wherein the monitoring device is attached to the object.

3. The method of claim 1, wherein the one or more sensors comprise at least one of an accelerometer, a location sensor, a proximity sensor, a pressure sensor, or a light sensor.

4. The method of claim 3, further comprising determining a time duration for which the audio data is captured based on at least one of accelerometer data obtained from the accelerometer, location sensor data obtained from the location sensor, and proximity sensor data obtained from the proximity sensor, wherein the one or more promotions are provided to the user based on the determined time duration.

5. The method of claim 1, wherein the capturing of the audio data of the user in contact with the object is performed until the object is detected to be idle for a predefined period of time based on data from the one or more sensors.

6. The method of claim 1, wherein the movement event is detected based on one of:
    determining accelerometer data, associated with the object, is greater than a pre-defined threshold, or
    determining a change in a location of the object based on the location data.

7. The method of claim 1, wherein the one or more promotions are displayed to the user on a display screen of the monitoring device.

8. A monitoring device to predict a time instant for providing one or more promotions to a user, the monitoring device comprising:
    a processor; and
    a memory communicatively coupled to the processor, wherein the memory stores processor instructions, which, on execution, causes the processor to:
    detect a movement event associated with an object using one or more sensors;
    initialize capturing of audio data of a user in contact with the object on detection of the movement event;
    determine an emotion, associated with the object, of the user based on the audio data;
    select one or more promotions to be provided to the user based on the emotion, the audio data, one or more pre-defined locations, a pre-defined sale target, historical behavior of a plurality of users associated with the object, a time duration of the user with the object, and a count of pick-up gestures for the object;
    predict in real time, a time instant at which the one or more promotions are provided to the user based on an association between at least one of the emotion determined based on the audio data, the audio data, location data of the object, location data of the user associated with the object, the time duration of the user with the object and, the pick-up gestures or the object; and
    transmitting, by the monitoring device, the association between the at least one of the emotion, the audio data, the location data of the object, the location data of the user associated with the object, the time duration of the user with the object, and the pick-up gestures for the object, to a third party server.

9. The monitoring device of claim 8, wherein the monitoring device is attached to the object.

10. The monitoring device of claim 8, wherein the one or more sensors comprise at least one of an accelerometer, a location sensor, a proximity sensor, a pressure sensor, or a light sensor.

11. The monitoring device of claim 10, wherein the processor is further configured to determine a time duration for which the audio data is captured based on at least one of accelerometer data obtained from the accelerometer, location sensor data obtained from the location sensor, and proximity sensor data obtained from the proximity sensor, wherein the one or more promotions are provided to the user based on the determined time duration.

12. The monitoring device of claim 8, wherein the capturing of the audio data of the user in contact with the object is performed until the object is detected to be idle for a predefined period of time based on data from the one or more sensors.

13. The monitoring device of claim 8, wherein the movement event is detected based on one of:
    determining accelerometer data, associated with the object, is greater than a pre-defined threshold, or
    determining a change in a location of the object based on the location data.

14. The monitoring device of claim 8, wherein the one or more promotions are displayed to the user on a display screen of the monitoring device.

15. A non-transitory computer-readable storage medium having stored thereon, a set of computer-executable instructions for causing a computer comprising one or more processors to perform steps comprising:
    detecting a movement event associated with an object using one or more sensors;
    initializing capturing of audio data of a user in contact with the object on detection of the movement event;
    determining an emotion, associated with the object, of the user based on the audio data;
    selecting, by the monitoring device, one or ore promotions to be provided to the user based on the emotion, the audio data, one or more ore-defined locations, a pre-defined sale target, historical behavior of a plurality of users associated with the object, a time duration of the user with the object, and a count of pick-uo gestures for the object;
    predicting in real time, a time instant at which the one or more promotions are provided to the user based on an association between at least one of the emotion determined based on the audio data, the audio data, location data of the object, location data of the user associated with the object, the time duration of the user with the object, and the pick-up gestures for the object, and
    transmitting, by the monitoring device, the association between the at least one of the emotion, the audio data, the location data of the object, the location data of the user associated with the object, the time duration of the user with the object, and the pick-up gestures for the object, to a third party server.

* * * * *